United States Patent
Katagiri et al.

(10) Patent No.: US 7,110,593 B2
(45) Date of Patent: Sep. 19, 2006

(54) METHOD AND SYSTEM FOR GENERATING THREE-DIMENSIONAL DATA

(75) Inventors: Tetsuya Katagiri, Kyoto (JP); Toshio Norita, Osaka (JP)

(73) Assignee: Minolta Co., Ltd., Osaka (JP)

( * ) Notice: Subject to any disclaimer, the term of this patent is extended or adjusted under 35 U.S.C. 154(b) by 680 days.

(21) Appl. No.: 09/960,748

(22) Filed: Sep. 24, 2001

(65) Prior Publication Data

US 2002/0051006 A1    May 2, 2002

(30) Foreign Application Priority Data

Sep. 26, 2000   (JP)   ............................. 2000-291489

(51) Int. Cl.
*G06K 9/00* (2006.01)
(52) U.S. Cl. ................... 382/154; 382/285; 345/420; 356/611
(58) Field of Classification Search ................ 382/154, 382/285, 293; 356/601–613
See application file for complete search history.

(56) References Cited

U.S. PATENT DOCUMENTS

| | | | |
|---|---|---|---|
| 5,640,170 A * | 6/1997 | Anderson | 343/895 |
| 6,228,028 B1 * | 5/2001 | Klein et al. | 600/437 |
| 6,356,272 B1 * | 3/2002 | Matsumoto et al. | 345/582 |
| 6,363,169 B1 * | 3/2002 | Ritter et al. | 382/154 |
| 6,411,725 B1 * | 6/2002 | Rhoads | 382/100 |
| 6,640,004 B1 * | 10/2003 | Katayama et al. | 382/154 |

FOREIGN PATENT DOCUMENTS

| | | | |
|---|---|---|---|
| JP | 10332347 A | * | 12/1998 |
| JP | 2000-099760 | | 4/2000 |
| JP | 2000-111320 | | 4/2000 |
| JP | 2000-339467 | | 12/2000 |

OTHER PUBLICATIONS

Website of "Polhemus A Rockwell Collins Company", Polhemus, 40 Hercules Drive, Colchester, VT 05446, http://www.polhemus.com/fastcan.htm.

* cited by examiner

*Primary Examiner*—Jingge Wu
*Assistant Examiner*—Charles Kim
(74) *Attorney, Agent, or Firm*—McDermott Will & Emery LLP

(57) ABSTRACT

The apparatus is comprised by a three-dimensional measurement device for measuring an object and generating three-dimensional data of the object; a control device for changing a position or a posture of the object; a three-dimensional position sensor for measuring a relative position or a relative posture between the three-dimensional measurement device and the object; and a computer device for integrating plural sets of three-dimensional data based on a measurement result of the three-dimensional position sensor.

23 Claims, 16 Drawing Sheets

METHOD AND SYSTEM FOR GENERATING THREE-DIMENSIONAL DATA

This application is based on Japanese Patent Application No. 2000-291489 filed on Sep. 26, 2000, the contents of which are hereby incorporated by reference.

BACKGROUND OF THE INVENTION

1. Field of the Invention

The present invention relates to a method and a system for generating three-dimensional data in which a set of three-dimensional data are generated by integrating plural sets of three-dimensional data obtained by measuring an object from different positions.

2. Description of the Prior Art

In order to generate three-dimensional data of a shape of a whole periphery (an outline) of an object, it is necessary to conduct plural times of three-dimensional measurements of the object from different positions and to integrate the plural sets of three-dimensional data.

For example, three-dimensional data of an upper body of a person are obtained by integrating plural sets of three-dimensional data obtained by measuring a front side, a left side, a right side, a back side and so on of the person.

Additionally, in the case where precise measurement of a part of the object is desired, plural times of three-dimensional measurements of the part are conducted from different positions. Three-dimensional data obtained by the measurements are integrated so that precise three-dimensional data of the part can be obtained.

FIG. 16 shows an example of conventional system for obtaining plural sets of three-dimensional data by measuring an object from different positions.

The three-dimensional measurement device 91 shown in FIG. 16 generates three-dimensional data of the object Q by the light section method or the like. The turn table 92 rotates about the rotational axis L' to change a relative position or a relative posture between the object Q set thereon and the three-dimensional measurement device 91. A relative position and a relative posture between the three-dimensional measurement device 91 and the rotational axis L' are fixed. As the processor 93, there may be used a computer device including a personal computer or workstation.

Plural sets of three-dimensional data of the object Q are obtained by rotating the turn table 92 and changing the relative position or the relative posture between the object Q and the three-dimensional measurement device 91. The processor 93 integrates the plural sets of three-dimensional data based on a rotational angle of the turn table 92 during the generation of the plural sets of three-dimensional data, the relative position and the relative posture between the three-dimensional measurement device 91 and the rotational axis L' and so on, to thereby generate a set of three-dimensional data.

According to the method described above, it is possible to obtain three-dimensional data of an object Q with respect to a whole periphery on a rotating direction.

However, parts such as a human head that cannot be included in the measuring range of the three-dimensional measurement device 91 even when rotating the turn table 92 may sometimes be left unmeasured.

Further, occlusion may occur in a part such as chin even if measurement is conducted from any positions with rotating the turn table 92. In such a case, three-dimensional data of the part cannot be obtained.

Moreover, a position and an axial direction of the rotational axis L with respect to the three-dimensional measurement device 91 needs to be calculated by using, for example, a specific chart in order to decide the relative position and the relative posture between the three-dimensional measurement device 91 and the turn table 92 in advance of the three-dimensional measurement. Such system may impose an extra workload on a user and may cause increase in the production cost.

SUMMARY OF THE INVENTION

An object of the present invention is to solve problems as described above. Another object of the present invention is to reduce immeasurable parts in three-dimensional measurement compared to conventional methods. Yet another object of the present invention is to provide a system for generating highly precise three-dimensional data of an object having a complicated shape.

In generation of a set of three-dimensional data by integration of plural sets of three-dimensional data, further object of the present invention is to enhance variance in a positional relationship between a three-dimensional measurement device and an object when the plural sets of three-dimensional data are obtained.

According to one aspect of the present invention, the three-dimensional data generating system comprises a measurement portion for generating three-dimensional data by measuring a three-dimensional shape of an object, a position and posture changing portion for changing a position or a posture of the object, a position and posture sensing portion including a first element provided in the measurement portion and a second element provided in the position and posture changing portion, wherein the position and posture sensing portion measures a relative position and a relative posture between the first element and the second element and a data integrating portion for integrating plural sets of three-dimensional data generated by plural times of measurements in the measurement portion based on each of the relative positions and the relative postures measured by the position and posture sensing portion at each of the measurements.

Preferably, the position and posture changing portion includes a movable member whose position and posture are kept constant with respect to the object when each of the measurements is conducted and the second element is provided in the movable member.

Additionally, the position and posture changing portion further includes a support board for changing the position and the posture of the movable member and the movable member is a turn table rotationally driven by the support board.

According to another aspect of the present invention, the three-dimensional data generating system comprises a measurement portion for generating three-dimensional data by measuring a three-dimensional shape of an object without contacting the object, a sensor for measuring a relative position and a relative posture between either one of a first member and a second member and the measurement portion, the first member whose position and posture being kept constant with respect to the object during plural times of measurements by the measurement portion and the second member being capable of detecting a relative position or a relative posture with respect to the first member and a data integrating portion for integrating plural sets of three-dimensional data generated by the plural times of measurements based on each of the relative positions and the relative postures measured by the sensor at each of the measurements.

According to yet another aspect of the present invention, the three-dimensional data generating system comprises a measurement device for generating three-dimensional data by measuring a three-dimensional shape of an object from an arbitrary position at an arbitrary posture, a sensor for measuring a position and a posture of the measurement device at each of the measurements and a data integrating portion for integrating the three-dimensional data of the object generated by the plural times of measurements at different positions and postures.

BRIEF DESCRIPTION OF THE DRAWING

FIG. 2 illustrates a principle of the three-dimensional position sensor and so on.

DESCRIPTION OF THE PREFERRED EMBODIMENTS

First Embodiment

Figure 1:
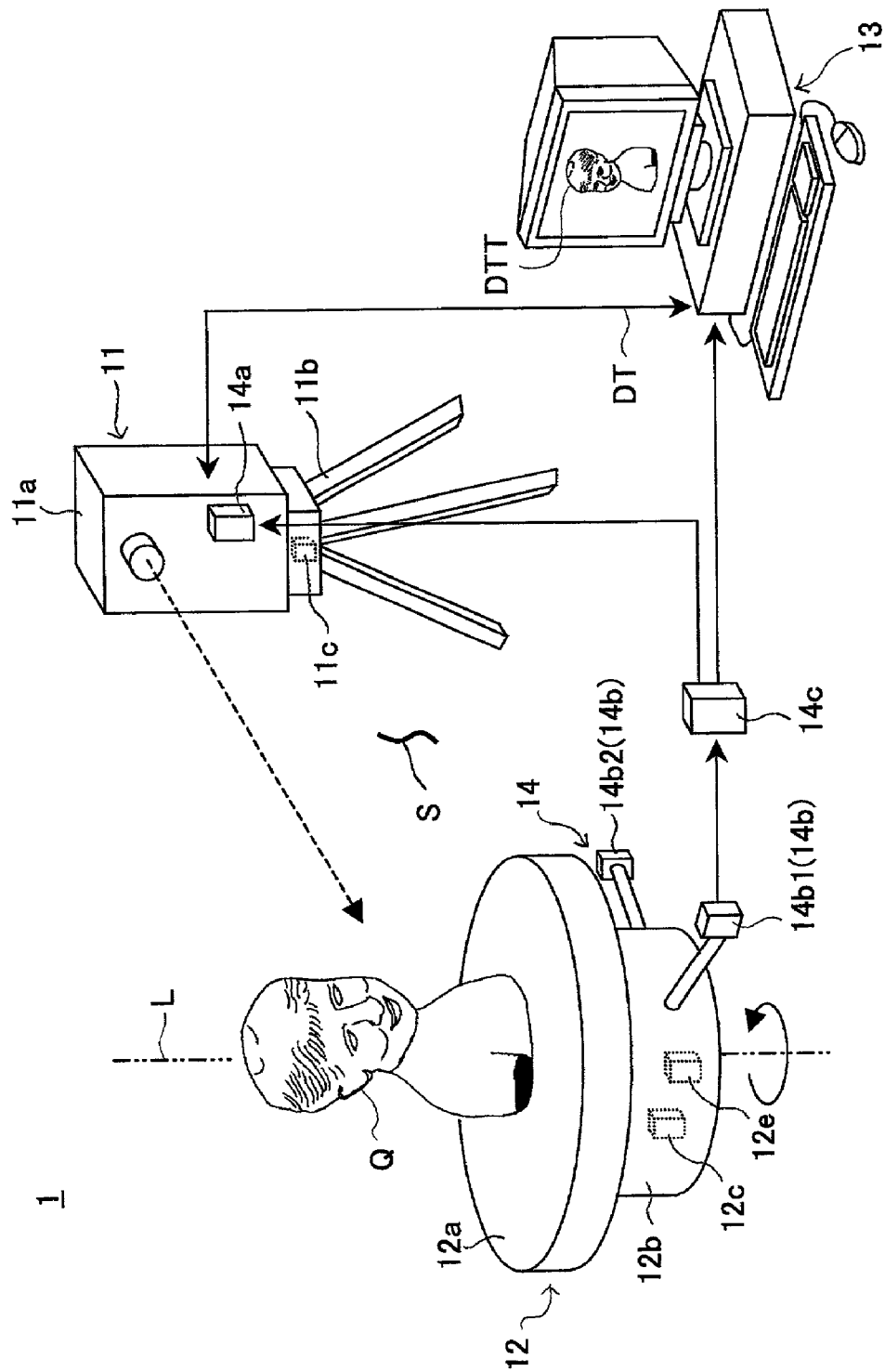
FIG. 1 shows a three-dimensional data generating system according to a first embodiment of the present invention.

As shown in FIG. 1, the three-dimensional data generating system 1 comprises a three-dimensional measurement device 11, a position and posture changing device 12, a computer device 13, a three-dimensional position sensor 14 and the like.

The three-dimensional measurement device 11 comprises a three-dimensional camera 11a, a support medium 11b and the like.

The three-dimensional camera 11a serves to perform three-dimensional measurement of an object Q and to generate three-dimensional data (three-dimensional shape data) DT. For example, a three-dimensional camera that can measure depths and luminances of points in a single dimensional or two-dimensional image area may be used as the three-dimensional camera 11a.

Also, the three-dimensional data DT may be generated by photographing the object Q using plural optical cameras set at different positions to obtain two-dimensional images, and then detecting corresponding points of the obtained two-dimensional images by the stereo imaging method. Further, it is possible to use the three-dimensional camera 11a only for three-dimensional measurement and to use the computer device 13 for generating the three-dimensional data DT based on a result of the three-dimensional measurement.

The support medium 11b supports the three-dimensional camera 11a at an arbitrary position or an arbitrary posture. A tripod mount may be used as the support medium 11b, for example. A user may arrange the three-dimensional camera 11a at an arbitrary position or posture by, for example, adjusting a position or a height of the tripod mount. The support medium may be adapted to automatically adjust its position or posture by means of power of a motor 11c or the like in accordance with a command transmitted by the computer device 13.

The position and posture changing device 12 comprises a turn table 12a, a support board 12b and so on.

The support board 12b is provided as being fixed with respect to space S and serves to rotationally drive the turn table 12a provided thereon. The object Q is placed on the turn table 12a. The turn table 12a changes a position or a posture of the object Q by rotating about the rotational axis L in the vertical direction by means of power of a motor 12c in accordance with a command transmitted from the computer device 13.

The turn table 12a is provided with an encoder 12e that generates pulses in accordance with the rotation of the turn table 12a.

The computer device 13 comprises a CPU, a RAM, a ROM, a magnetic memory device, a keyboard, a mouse, a program and data memorized in the RAM and so on. The computer device 13 serves to generate a desired set of three-dimensional data DTT based on plural sets of three-dimensional data DT, to perform an operation for controlling the three-dimensional measurement device 11 or the position and posture changing device 12 and to carry out processing for other various operations.

The computer device 13, the three-dimensional measurement device 11 and the position and posture changing device 12 are connected to one another via a cable or wireless communication.

The three-dimensional position sensor 14 comprises a transmitter 14a, receivers 14b, a control unit 14c and the like and serves to detect a relative position and a relative posture between the transmitter 14a and each of the receivers 14b in the space S.

The transmitter 14a is mounted on the three-dimensional camera 11a, and a position or a posture thereof changes in accordance with a change of the position or the posture of the three-dimensional camera 11a. The receivers 14b are mounted on the support board 12b at different positions. It is possible to detect the positions and postures of the three-dimensional measurement device 11 and the object Q by detecting the relative positions and the relative postures between the transmitter 14a and the receivers 14b and then performing an operation by the position and posture operating portion 130 to be described later in this specification. The receivers 14b may sometimes be separately referred to as a receiver 14b1 and a receiver 14b2 as required.

The control unit 14c comprises a drive circuit 14c1, a detection circuit 14c2 and an output portion 14c3 and so on. The drive circuit 14c1 serves to send alternating current to the transmitter 14a, and the detection circuit 14c2 serves to detect an output signal from the receivers 14b. The output portion 14c3 transmits the detection result and the like to the computer device 13. The computer device 13 calculates the relative position between the transmitter 14a and the receivers 14b as well as the relative posture therebetween based on the detection result and so on.

Figure 2:
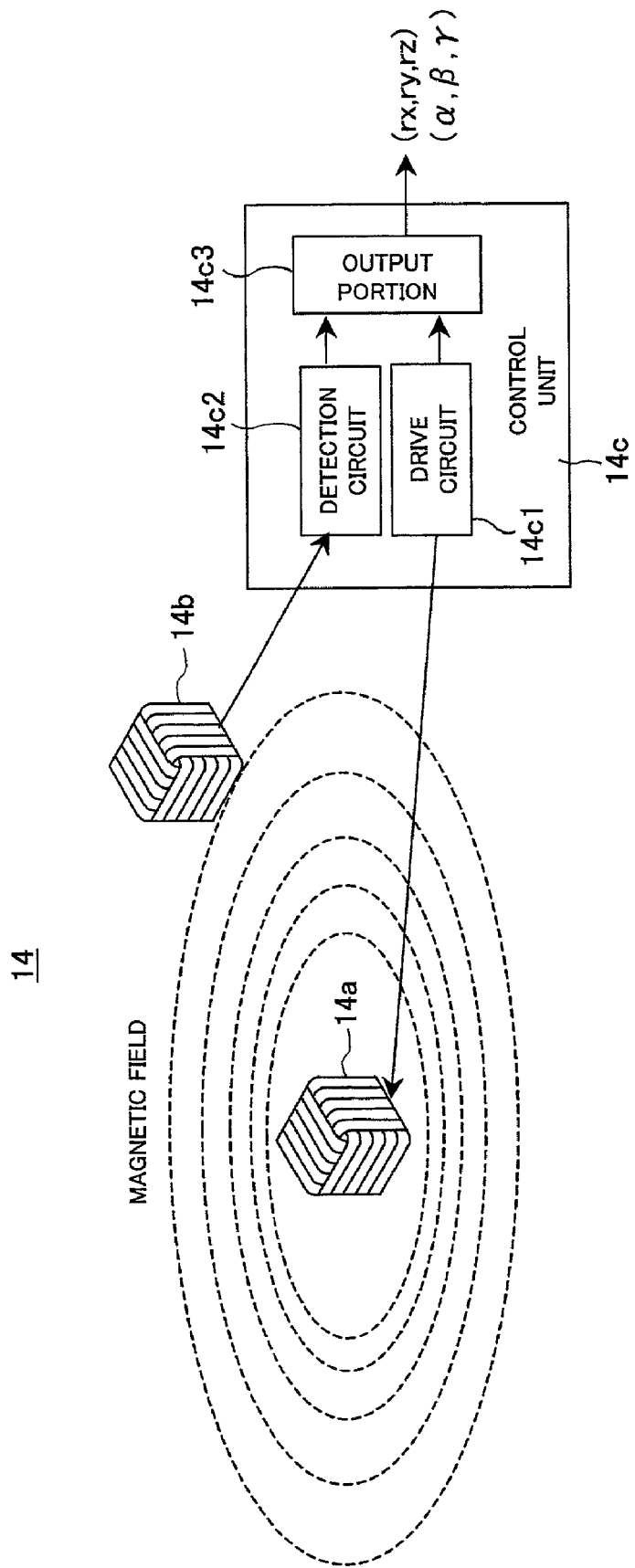

A principle of the three-dimensional position sensor 14 will be described below. As shown in FIG. 2, the transmitter 14a comprises an orthogonal coil. A magnetic field occurs when alternating current is applied to the orthogonal coil. Each of the receivers 14b comprises an orthogonal coil, and inductive current is produced in the orthogonal coil when the receivers 14 are placed in the magnetic field of the transmitter 14a. The inductive current is measured at the detection circuit 14c2, and three-dimensional coordinate (rx, ry, rz) and Eulerian angle ($\alpha$, $\beta$, $\gamma$) are calculated from the measurement result, characteristics of the altering current applied to the transmitter 14a and so on.

Figure 3:
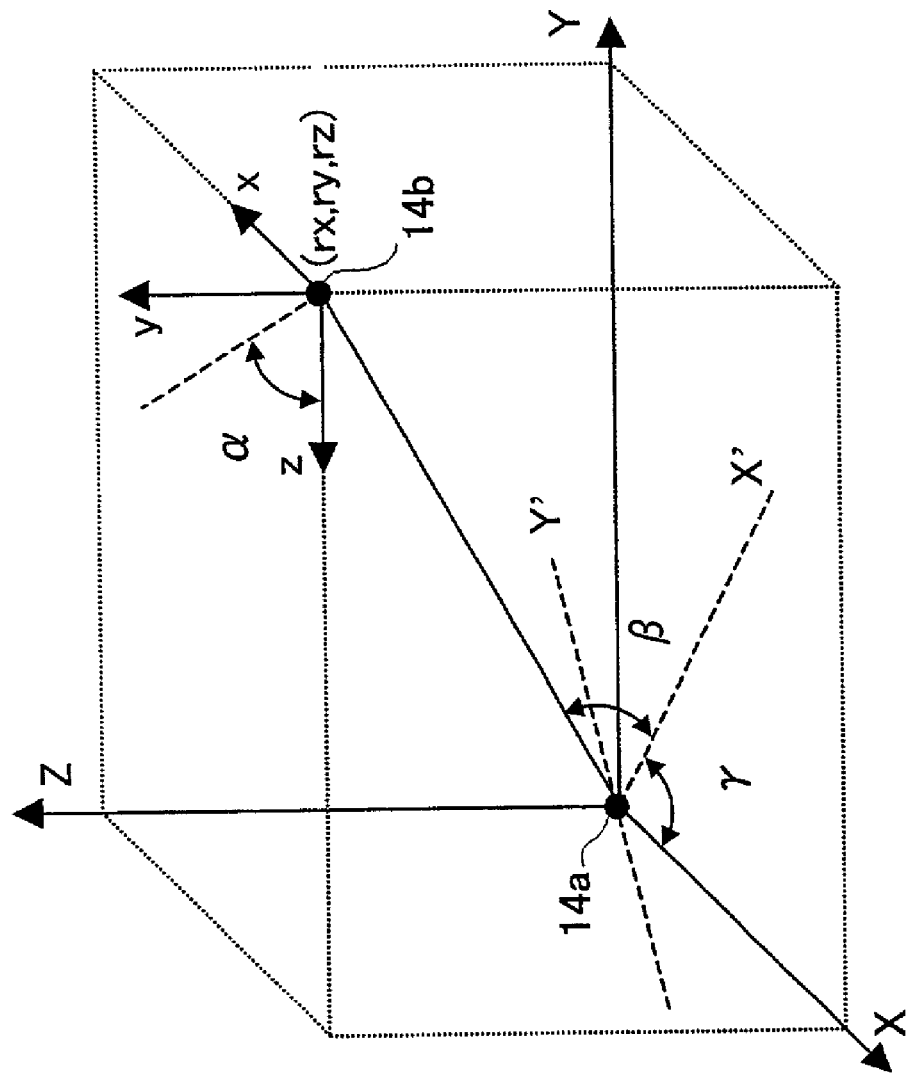
FIG. 3 shows an example of a relative position and a relative posture between a transmitter and a receiver.

As shown in FIG. 3, the three-dimensional coordinate (rx, ry, rz) represents positions of the receivers 14b with respect to the transmitter 14a, and each of the values of $\alpha$, $\beta$ and $\gamma$ represents a rotational angle (roll), an elevation angle (pitch) and an azimuth angle (yaw).

As the three-dimensional position sensor 14, there may be used "Inside Trak" of Polhemus.

Operating condition of commercially available three-dimensional position sensor is such that a distance between a transmitter and a receiver must be about 3 meters or less. Accordingly, two receivers 14b are mounted on the support board 12b at different positions in the present embodiment so that a position or a posture of either one of the receivers in above-mentioned operating condition is detected even when a position or a posture of the three-dimensional camera 11a is changed.

Figure 4:
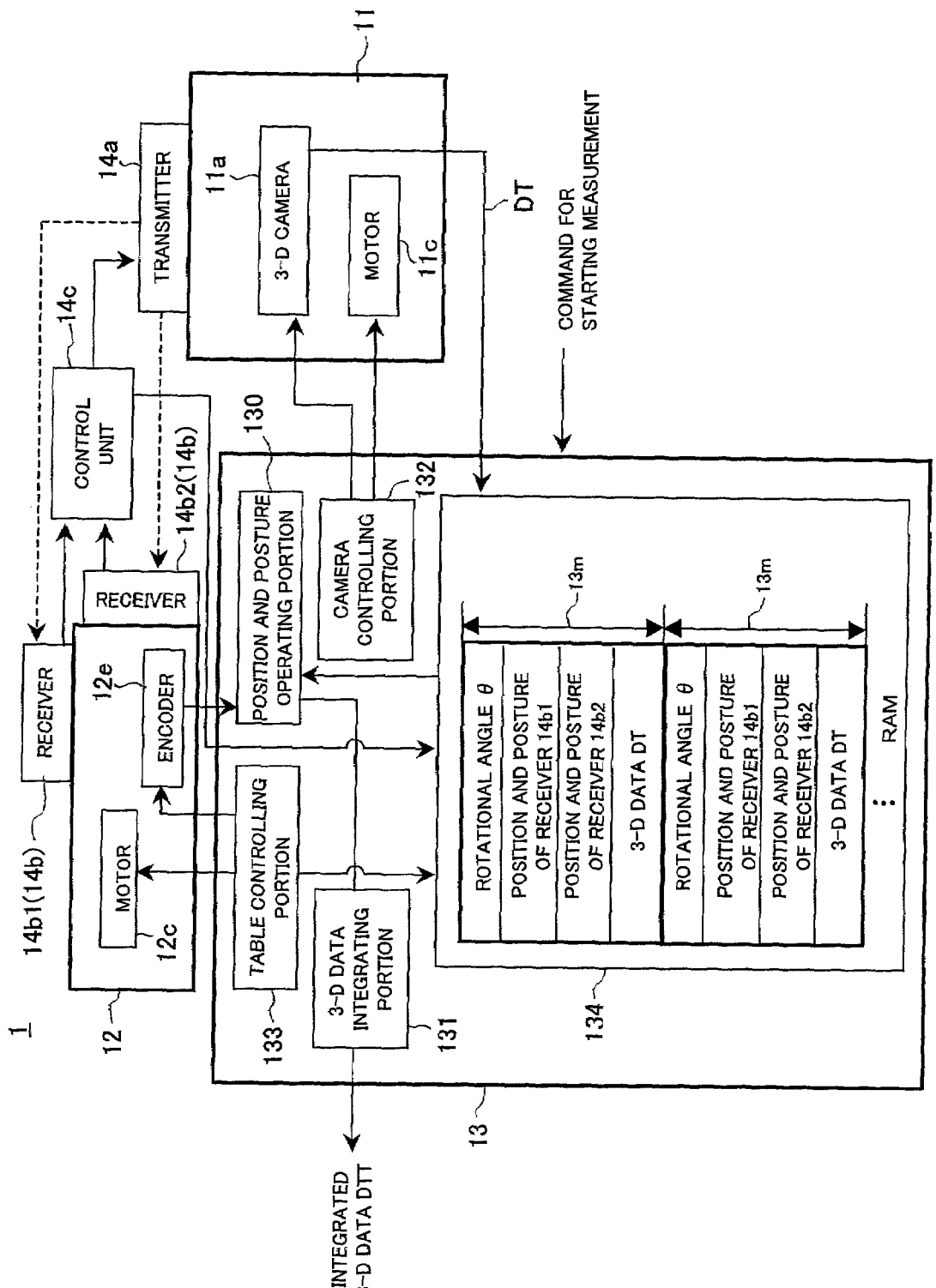
FIG. 4 is a block diagram showing a functional configuration of the three-dimensional data generating system according to the first embodiment.

Above-described structure enables the three-dimensional data generating system 1 to realize the functions shown in FIG. 4.

As shown in FIG. 4, the computer device 13 realizes the functions of the position and posture operating portion 130, the three-dimensional data integrating portion 131, the camera controlling portion 132 and the table controlling portion 133 by operating the program memorized in the RAM or the like in the CPU.

The position and posture operating portion 130 serves to calculate a relative position and a relative posture between the three-dimensional camera 11a and the object Q and to perform coordinate conversion of the three-dimensional data DT according to the calculation results. Details of the calculation and the coordinate conversion will be described below.

The three-dimensional data integrating portion 131 integrates plural sets of three-dimensional data DT that have been subjected to the coordinate conversion by the position and posture operating portion 130 and generates desired three-dimensional data DTT.

The camera controlling portion 132 controls the three-dimensional measurement device 11 by transmitting a control command to the motor 11c for control of the position or the posture of the three-dimensional camera 11a, by transmitting data to the three-dimensional camera 11a by calculating measurement conditions regarding an exposure value and so on or by performing processing such as transmitting a command for executing a three-dimensional measurement to the three-dimensional camera 11a.

The table controlling portion 133 controls the position and posture changing device 12 by transmitting to the motor 12c a command, data or the like for controlling rotation of the turn table 12a.

The encoder 12e generates pulses in accordance with the rotation of the turn table 12a. The generated pulses are counted in the encoder 12e and the count value is output to a position and posture operating portion 130 as a rotational angle $\theta$ of the turn table 12a. The count value can be reset by receiving a reset signal from a table controlling portion 133.

Plural frames 13m are memorized in the memory area 134. The frames 13m are a collection of data for each of three-dimensional data DT, a rotational angle $\theta$ of the turn table 12a when the three-dimensional data DT is generated, a three-dimensional coordinate (rxn, ryn, rzn, wherein n=1, 2) of each of the receivers 14b1 and 14b2 and Eulerian angle ($\alpha$n, $\beta$n, $\gamma$n, wherein n=1, 2). Accordingly, the number of the frames 13m is the same as the number of measurements of the object Q.

Processing in the position and posture operating portion 130 will be described below. In order to integrate plural sets of three-dimensional data DT, it is necessary to impose uniformity to coordinate systems of all the three-dimensional data to be used for the integration. Accordingly, the three-dimensional data DT are converted into an identical three-dimensional coordinate system by using a conversion matrix M indicated by the following expression (1).

$$M = Tct \cdot Ttr \cdot Rtr \cdot Trb \cdot Rbo \qquad (1)$$

wherein, $$Rtr = \begin{pmatrix} \cos(-\alpha) & -\sin(-\alpha) & 0 \\ \sin(-\alpha) & \cos(-\alpha) & 0 \\ 0 & 0 & 1 \end{pmatrix}$$

$$\begin{pmatrix} \cos(-\beta) & 0 & -\sin(-\beta) \\ 0 & 1 & 0 \\ \sing(-\beta) & 0 & \cos(-\beta) \end{pmatrix} \begin{pmatrix} 1 & 0 & 0 \\ 0 & \cos(-\gamma) & -\sin(-\gamma) \\ 0 & \sin(-\gamma) & \cos(-\gamma) \end{pmatrix}$$

$$Rbo = \begin{pmatrix} 1 & 0 & 0 \\ 0 & \cos(-\theta) & -\sin(-\theta) \\ 0 & \sin(-\theta) & \cos(-\theta) \end{pmatrix}$$

Figure 5:
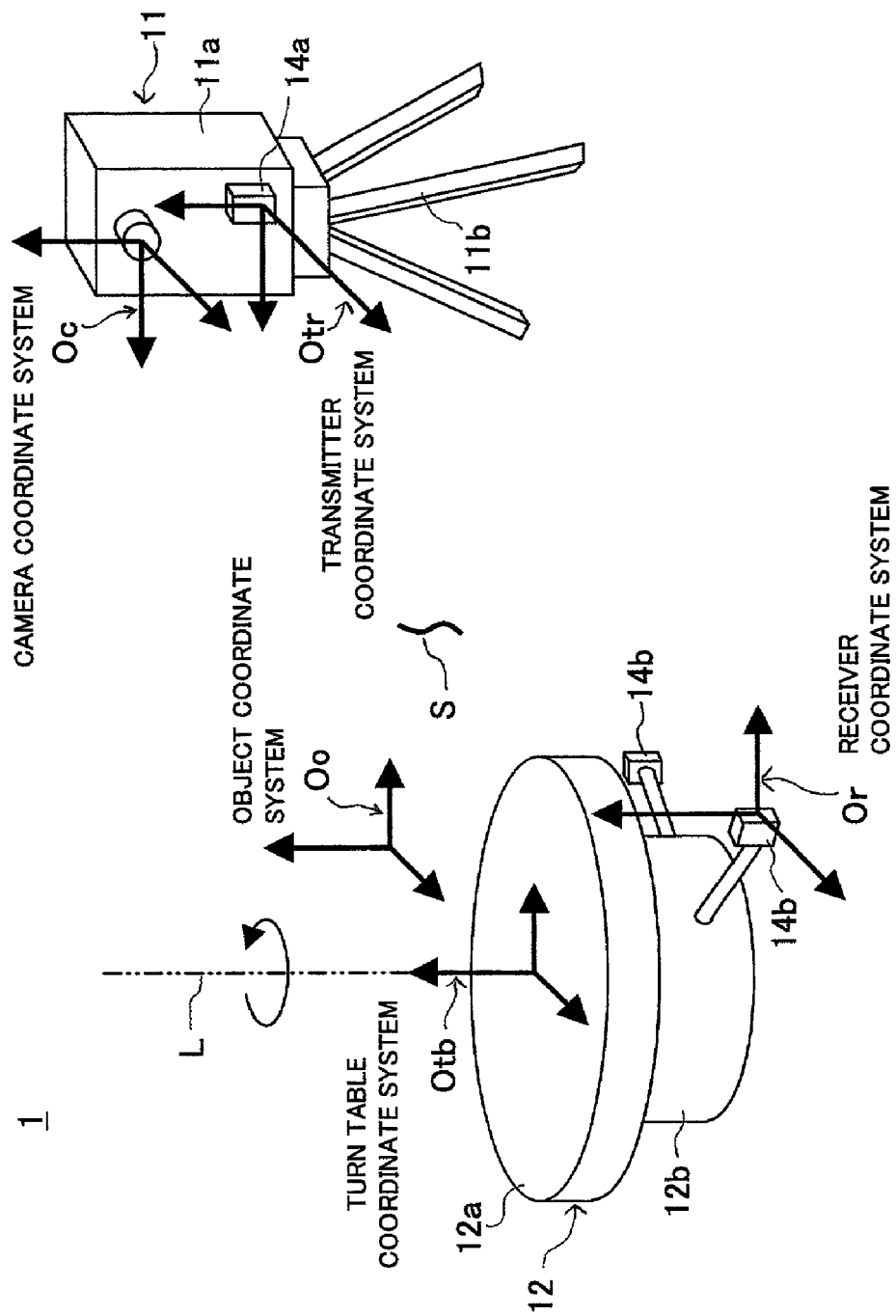
FIG. 5 shows five sets of three-dimensional coordinate systems present in the space.

As shown in FIG. 5, exist in the space S are five three-dimensional coordinate systems: a transmitter coordinate system Otr that is a three-dimensional coordinate system in the magnetic field occurring from the transmitter 14a; a camera coordinate system Oc having a visual line of the three-dimensional camera 11a as one of its axis; a receiver coordinate system Or that is a three-dimensional coordinate composed of the orthogonal coil of the receivers 14b; a turn table coordinate system Otb having the rotational axis L of the turn table 12a as one of its axis; and an object coordinate system Oo having an axis passing through the object Q in vertical direction as one of its axis.

In the expression (1), Tct serves to convert the camera coordinate system Oc into the transmitter coordinate system Otr. Tct is a predefined value as a positional relationship between visual points of the transmitter 14a and the three-dimensional camera 11a is known.

Ttr serves to parallely move the three-dimensional coordinates (rx, ry, rz) of the receivers 14b. Rtr serves to execute rotational movement about X axis by −α, a rotational movement about Y axis by −β and a rotational movement about Z axis by −γ. The transmitter coordinate system Otr is converted into the receiver coordinate system Or by estimating Ttr and Rtr in this order. Ttr and Rtr are calculated in the position and posture operating portion 130 in accordance with the detection result transmitted from the control unit 14c.

Trb serves to convert the receiver coordinate system Or into the turn table coordinate system Otb. The positional relationship between the receivers 14b and the turn table 12a is known and, therefore, Trb is a predefined value. Trb is defined with respect to each of the receivers 14b1 and 14b2.

Rbo serves to execute rotational movement about the rotational axis L by θ to convert the turn table coordinate system Otb into the object coordinate system Oo. Rbo is calculated in the position and posture operating portion 130 in accordance with the output value from the encoder 12e.

Thus, conversion matrix M that is used for converting the camera coordinate system Oc into the object coordinate system Oo is determined by estimating the five conversion matrixes as the expression (1). In other words, the position and the posture of the three-dimensional camera 11a in the object coordinate system Oo is calculated by using the conversion matrix M, thereby calculating the relative position and the relative posture between the object Q and the three-dimensional camera 11a.

By operating the conversion matrix M and each of the three-dimensional data DT, the three-dimensional coordinate systems of all the three-dimensional data DT are unified.

Hereafter, with reference to flowcharts, there will be described a processing of generating a set of desired three-dimensional data DTT by generating plural sets of three-dimensional data DT and integrating them.

Figure 6:
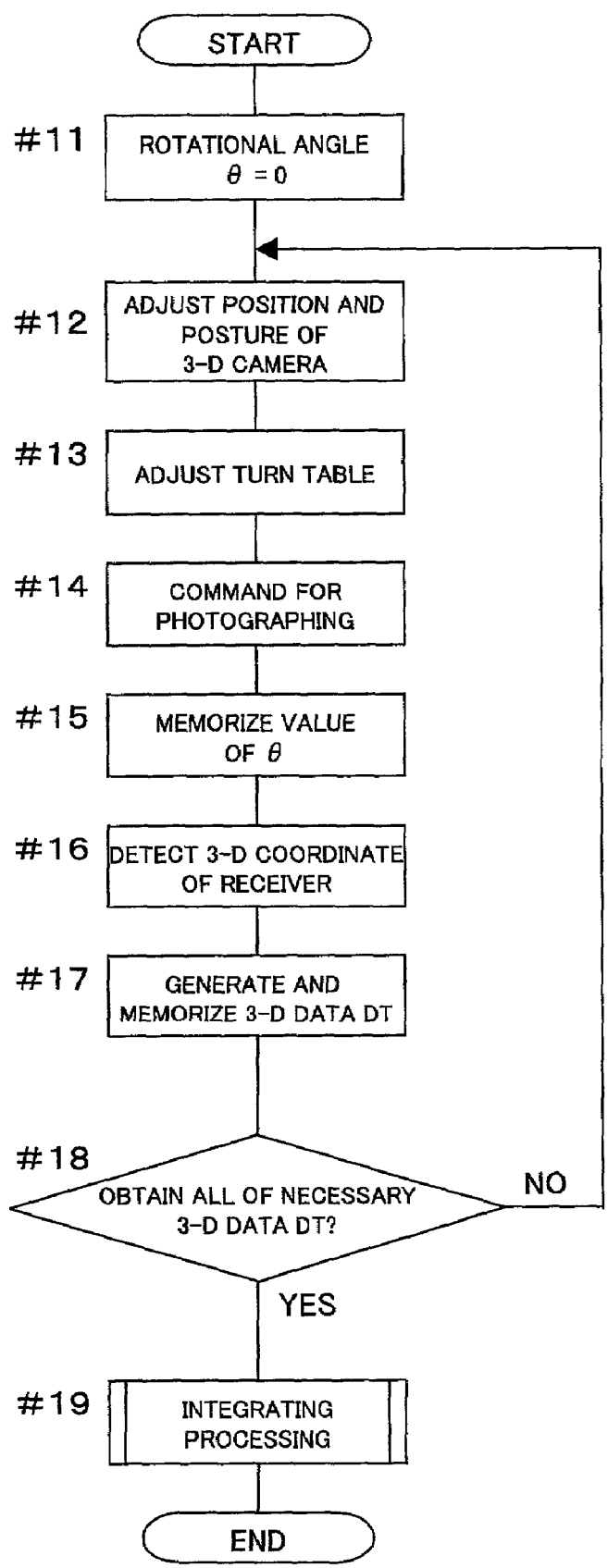
FIG. 6 is a flowchart illustrating a flow of processing of the three-dimensional data generating system according to the first embodiment.
Figure 7:
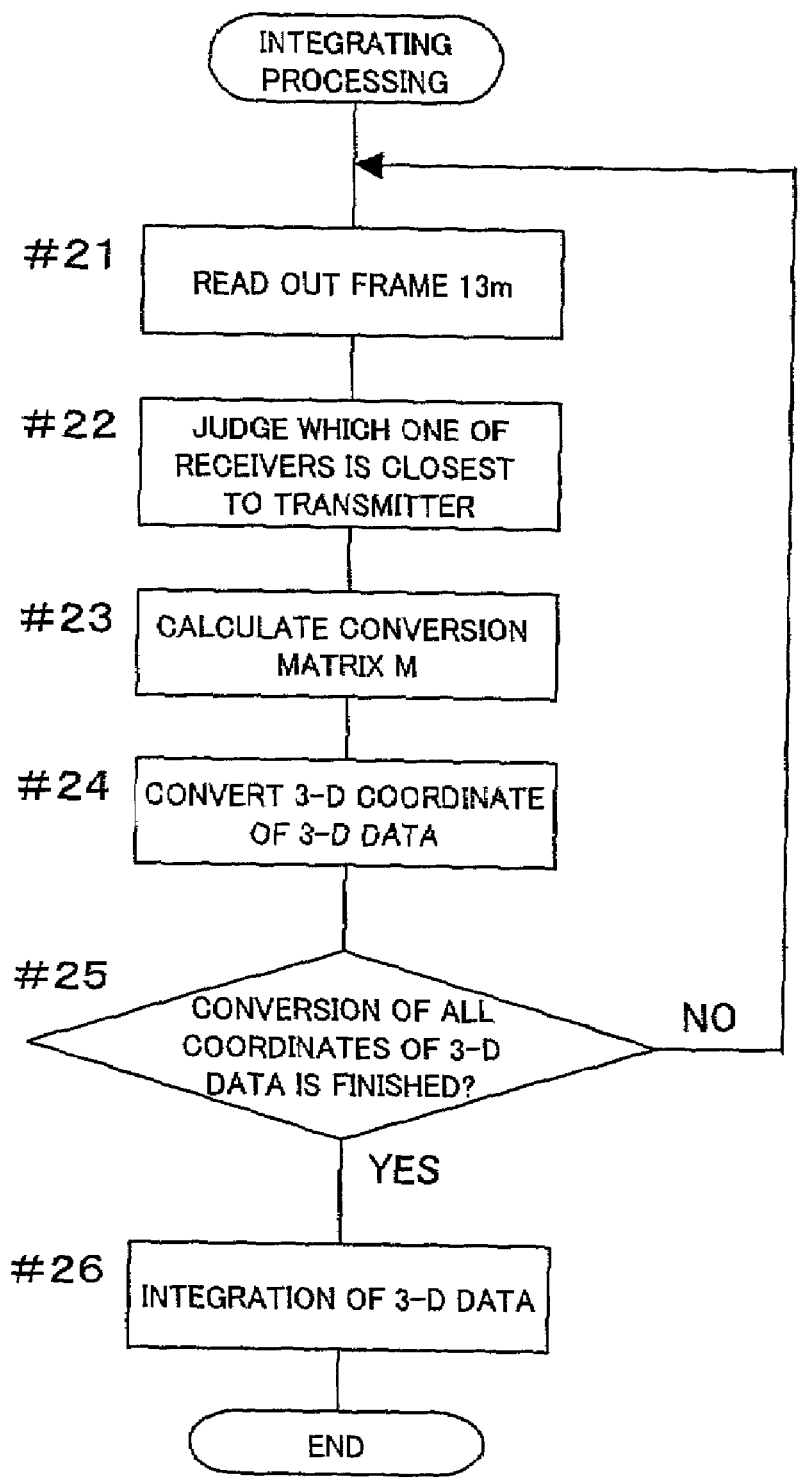
FIG. 7 is a flowchart illustrating processing of integrating three-dimensional data.

FIG. 6 is a flowchart illustrating a flow of processing of the three-dimensional data generating system 1 according to the first embodiment; FIG. 7 is a flowchart illustrating processing of integrating three-dimensional data DT.

Referring to FIG. 6, a rotational angle θ of the turn table 12a is reset to 0 (#11). Position and posture of the three-dimensional camera 11a are adjusted (#12), and then the turn table 12a is rotated to adjust a relative position and a relative posture between the object Q and the three-dimensional camera 11a (#13).

After defining the position and the postures, the three-dimensional data generating system 1 waits for a command for starting photographing from a user (#14). If the command is received by the three-dimensional data generating system 1, the rotational angle θ of the turn table 12a is memorized in the frame 13m (#15), and positions and postures of the receivers 14b1 and 14b2 are detected, followed by memorizing the three-dimensional coordinates (rxn, rxy, rxz) and Eulerian angle (αn, βn, γn) in the frame 13m (#16).

A command for starting a measurement is transmitted from the camera controlling portion 132 to the three-dimensional camera 11a, and the three-dimensional camera 11a generates the three-dimensional data DT by measuring the object Q. The three-dimensional data DT are memorized in the frame 13m (#17).

The steps #12 to #17 are repeated with changing the relative position and the relative posture between the object Q and the three-dimensional camera 11a to obtain three-dimensional data of the whole periphery or necessary parts of the object Q (#18).

After obtaining the necessary three-dimensional data DT (Yes in #18), integration of the three-dimensional data DT is performed using data thus obtained and memorized in the frame 13m (#19).

The integration of the three-dimensional data DT is performed in the processing order shown in FIG. 7. By reading out one of the frames 13m (#21), it is detected either one of the receivers 14b is closer to the transmitter 14a by calculating distances D from the receivers 14b to the transmitter 14a by using the following expression (2) (#22).

$$Dn = (rxn^2 + ryn^2 + rzn^2)^{1/2} \qquad (2)$$

Next, the conversion matrix M is calculated (#23). In above expression (2), there are used the three-dimensional coordinate and the Eulerian angle of either one of the receivers 14b that is detected to be closer to the transmitter 14a.

By using the conversion matrix M, three-dimensional coordinates of the three-dimensional data are converted so that the converted three-dimensional coordinates correspond to the object coordinate system Oo (#24).

In the case where the three-dimensional coordinates of the three-dimensional data DT are converted with respect to all of the frames 13m (yes in #25), the converted three-dimensional data DT are integrated to obtain desired three-dimensional data DTT (#26). In the case where a part of the frame 13m is left unconverted (No in #25), process returns to the step #21 to repeat above processing for the part of the frame 13m.

According to the three-dimensional data generating system 1 of the first embodiment, it is possible to reduce immeasurable parts by measuring the object Q from arbitrary positions and generating three-dimensional data thereof and, further, it is possible to obtain three-dimensional data that are high in precision even when the object has a complicated shape by integrating the generated three-dimensional data.

Second Embodiment

Figure 8:
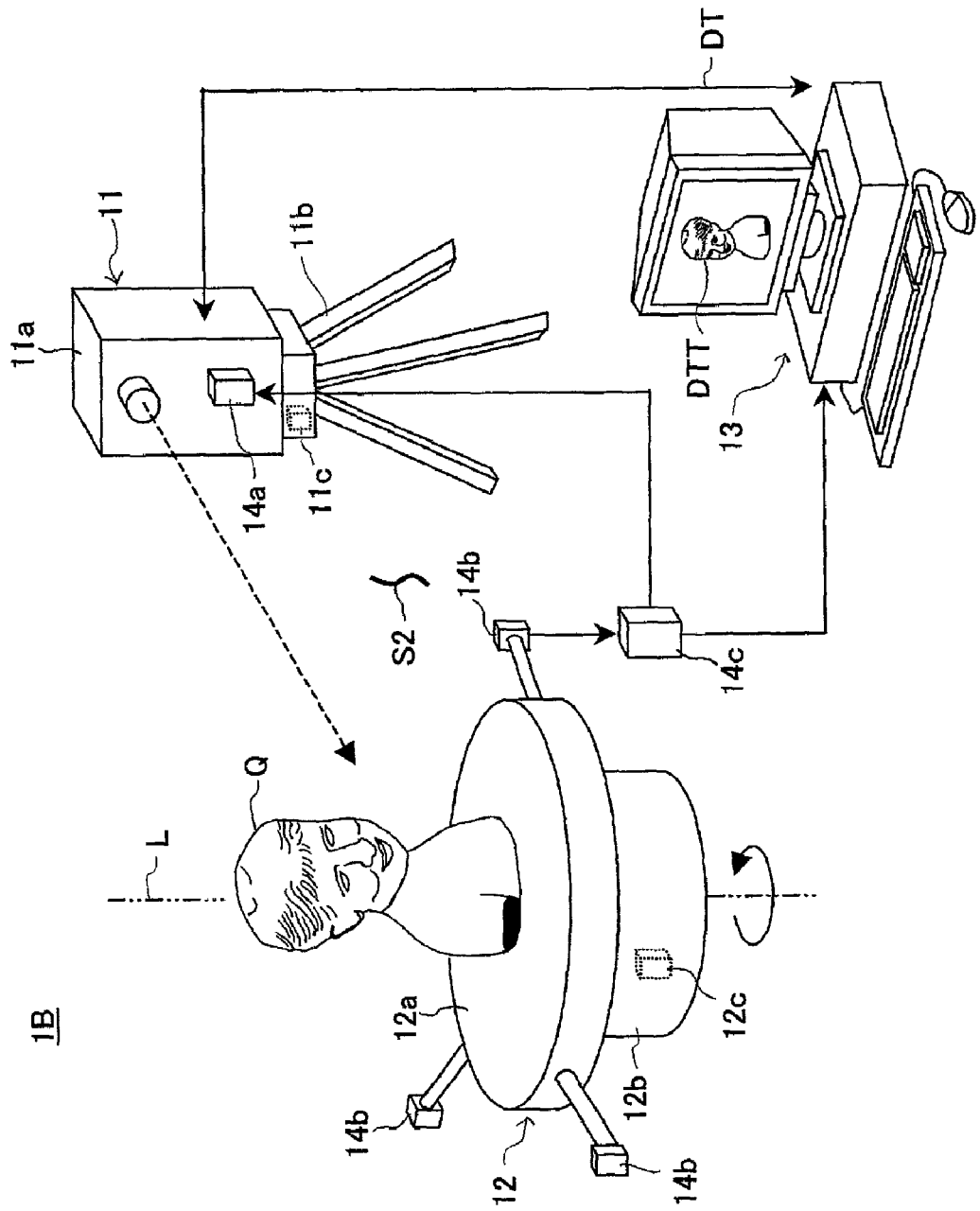
FIG. 8 shows a three-dimensional data generating system according to a second embodiment of the present invention.
Figure 9:
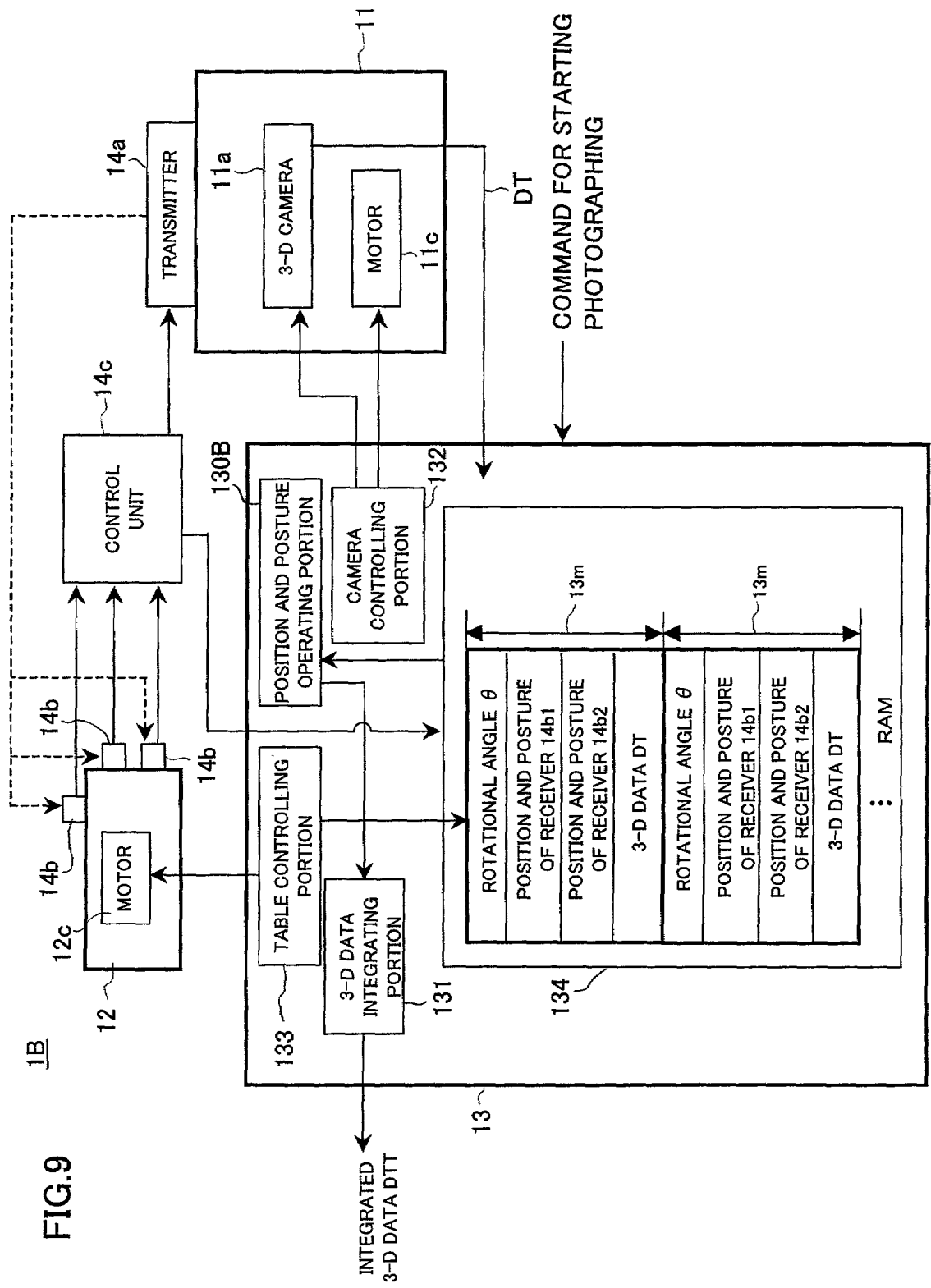
FIG. 9 is a block diagram showing a functional configuration of the three-dimensional data generating system according to the second embodiment.
Figure 10:
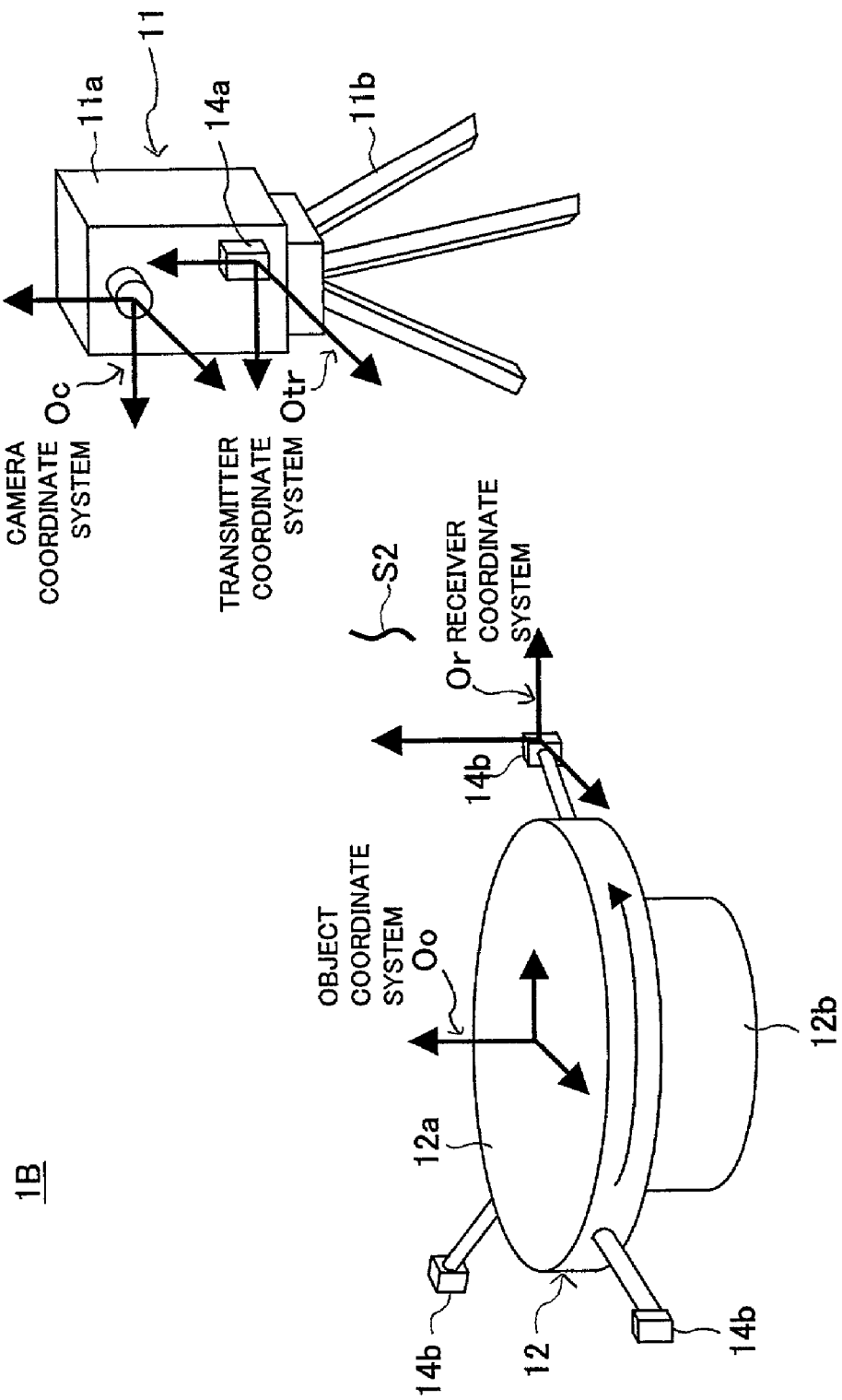
FIG. 10 shows four sets of three-dimensional coordinate systems present in the space.

FIG. 8 shows the three-dimensional data generating system 1B according to the second embodiment of the present invention. FIG. 9 is a block diagram showing a functional configuration of the three-dimensional data generating system 1B according to the second embodiment. FIG. 10 shows four sets of three-dimensional coordinate systems existing in the space S2.

In the FIGS. 8 to 10, the functions or configuration that are the same as the first embodiment are assigned the same reference numerals as those of the first embodiment and descriptions overlapping to the first embodiment and the second embodiment are eliminated in the following.

In the three-dimensional data generating system 1 of the first embodiment, the receivers 14b are fixed on the support board 12b. As shown in FIG. 8, the receivers 14b are mounted on the turn table 12a in the three-dimensional data generating system 1B of the second embodiment and, therefore, the receivers 14b move in accordance with rotation of the turn table 12a. In other words, the receivers 14b rotate about the rotational axis L with respect to the support board 12b.

Further, three sets of the receivers 14b are mounted on the turn table 12a at different positions. Other parts of the structure of the three-dimensional data generating system 1B are the same as those of the three-dimensional data generating system 1 of the first embodiment.

Functions shown in FIG. 9 are realized on the three-dimensional data generating system 1B by way of the above-described structure.

In FIG. 9, in the same manner as the position and posture operating portion 130, the position and posture operating portion 130B converts the three-dimensional data DT into an identical three-dimensional coordinate system by using a conversion matrix M' shown in the following expression (3).

$$M' = Tct \cdot Ttr \cdot Rtr \cdot Tro \quad (3)$$

wherein, $$Rtr = \begin{pmatrix} \cos\alpha & -\sin\alpha & 0 \\ \sin\alpha & \cos\alpha & 0 \\ 0 & 0 & 1 \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} 1 & 0 & 0 \\ 0 & \cos\gamma & -\sin\gamma \\ 0 & \sin\gamma & \cos\gamma \end{pmatrix}$$

As shown in FIG. 10, there are four sets of three-dimensional coordinate systems in the space S2: a transmitter coordinate system Otr, a camera coordinate system Oc, a receiver coordinate system OrB and an object coordinate system Oo. The receiver coordinate system Orb is a three-dimensional coordinate system formed by an orthogonal coil of the receivers 14b.

In the expression (3), Tct converts the camera coordinate system Oc into the transmitter coordinate system Otr in the same manner as that of the expression (1).

Tro converts the receiver coordinate system OrB into the object coordinate system Oo. Tbo is a predefined value since a positional relationship between the receivers 14b and a table top of the turn table 12a, on which the object Q is to be placed, is known.

Ttr and Rtr are estimated in this order to convert the transmitter coordinate system Otr into the receiver coordinate system OrB.

By estimating above four sets of conversion matrixes according to the expression (3), the conversion matrix M' for converting the camera coordinate system Oc into the object coordinate system Oo is obtained.

All the three-dimensional coordinate systems of the three-dimensional data DT to be used for integration are unified by operating the conversion matrix M' and the three-dimensional data DT.

Other functional configurations are the same as the first embodiment.

Figure 11:
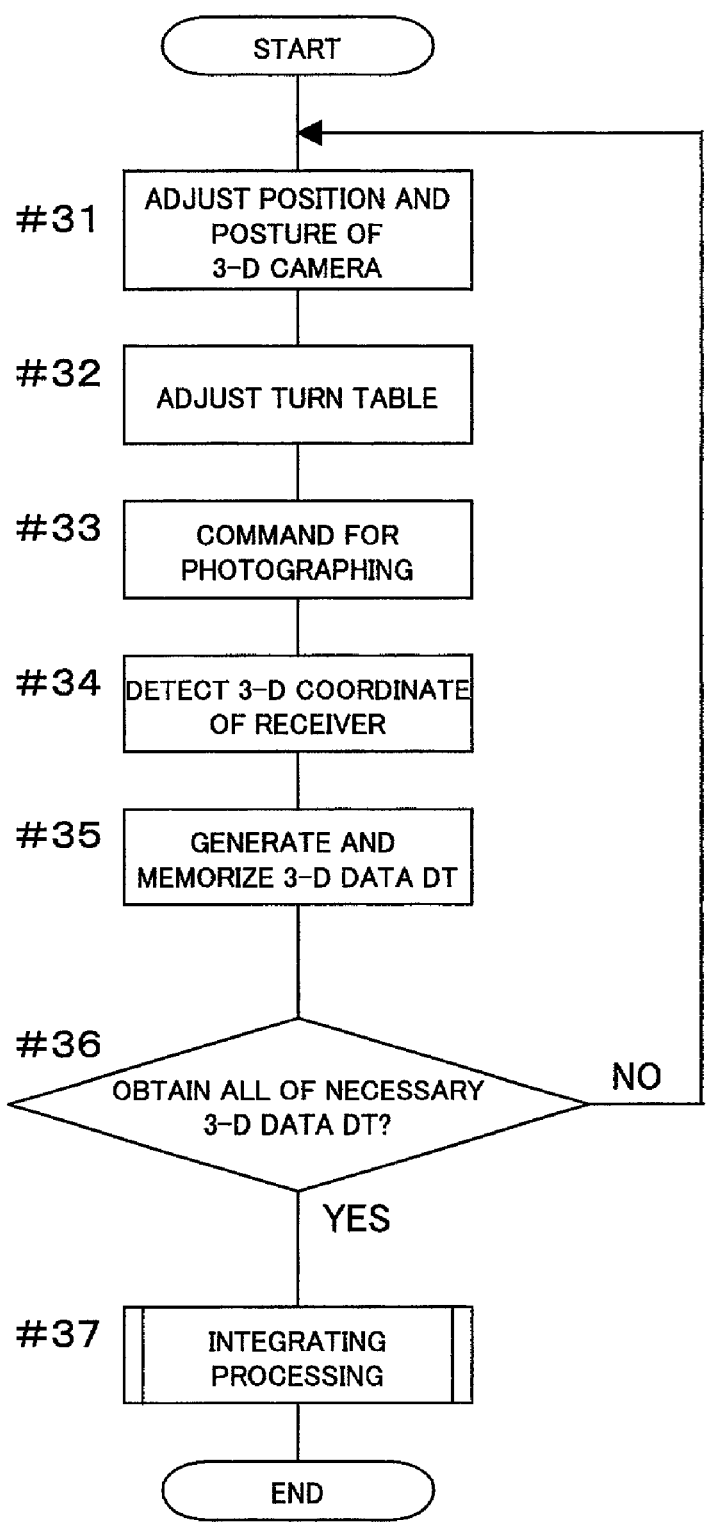
FIG. 11 is a flowchart illustrating a flow of processing of the three-dimensional data generating system according to the second embodiment.

FIG. 11 is a flowchart illustrating a flow of processing of the three-dimensional data generating system 1B in the second embodiment.

As shown in FIG. 11, positions of the three-dimensional camera 11a and the turn table 12a are adjusted, and a relative position between the object Q and the three-dimensional camera 11a and a relative posture therebetween are adjusted (#31 and #32).

After receiving a command for starting photographing from a user (#33), positions and postures of the receivers 14b are detected and three-dimensional coordinates and Eulerian angles thereof are memorized in the frame 13m (#34). The object Q is measured to generate three-dimensional data DT and the three-dimensional data DT are memorized in the frame 13m (#35).

It is then judged if all of necessary three-dimensional dimensional data DT are obtained or not (#36). In the case where the three-dimensional data DT have been obtained, integration processing of the three-dimensional data DT is performed (#37). In the case where the three-dimensional data DT have not been obtained, process returns to the step #31 to generate the three-dimensional data DT that have not been obtained.

According to the first and the second embodiments, a moving range of the transmitter 14a can be widened by mounting three receivers 14b, thereby enabling a user to easily perform three-dimensional measurement of a relatively large object.

Figure 12:
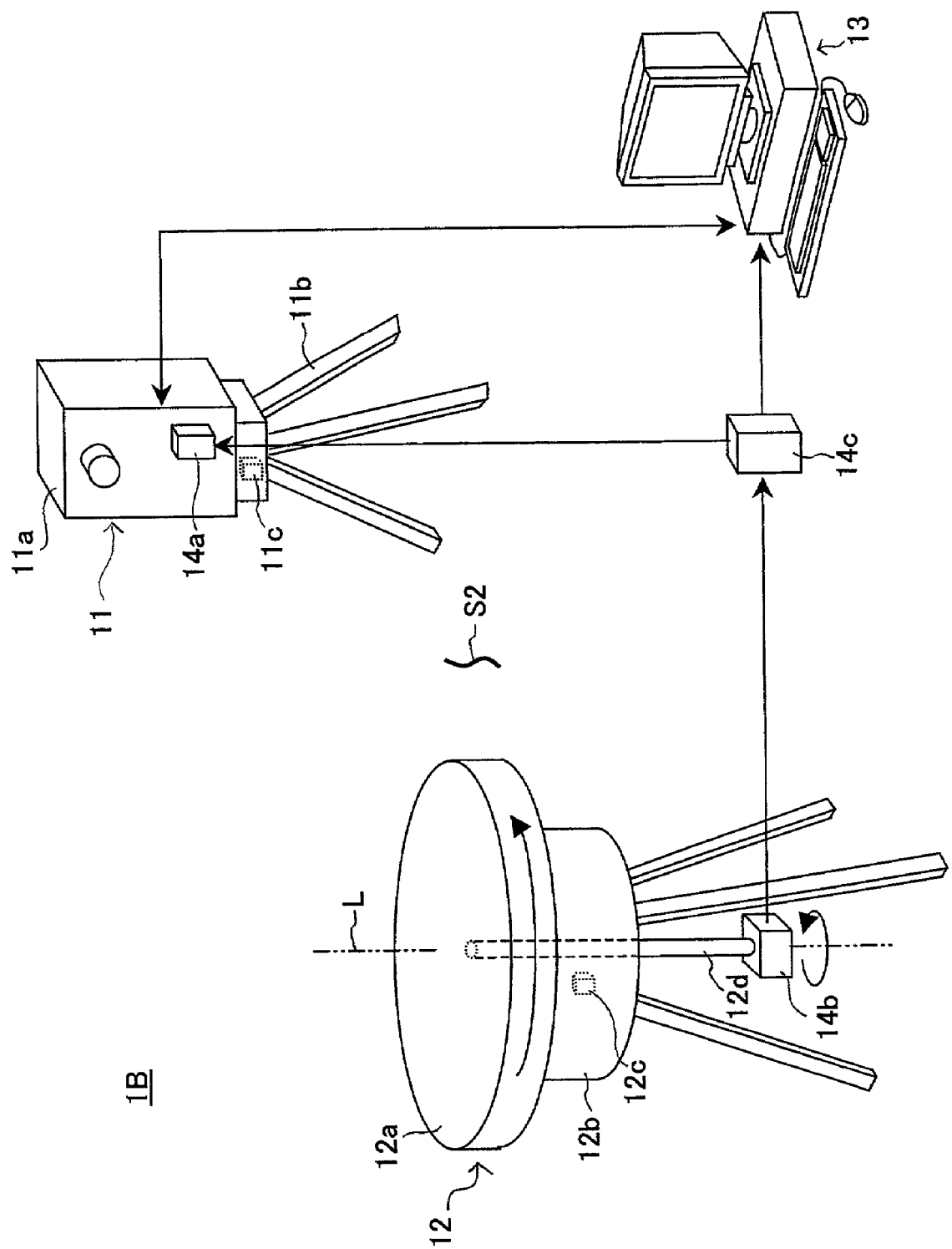
FIG. 12 shows a modification of the three-dimensional data generating system according to the second embodiment.

FIG. 12 shows a modification of the three-dimensional data generating system 1B of the second embodiment.

The receivers 14b used in the second embodiment are mounted on the turn table 12a irrespective of the positions as long as they rotate in accordance with the rotation of the turn table 12a. For example, as shown in FIG. 12, either one of the receivers 14b may be attached to a bottom end of a connection bar 12d connected to an undersurface of the turn table 12a in accordance with the rotation of the rotational axis L. Thus, since the receiver 14b rotates with the rotation of the turn table 12a, the desired three-dimensional data DTT are generated in the same manner as described above.

Third Embodiment

Figure 13:
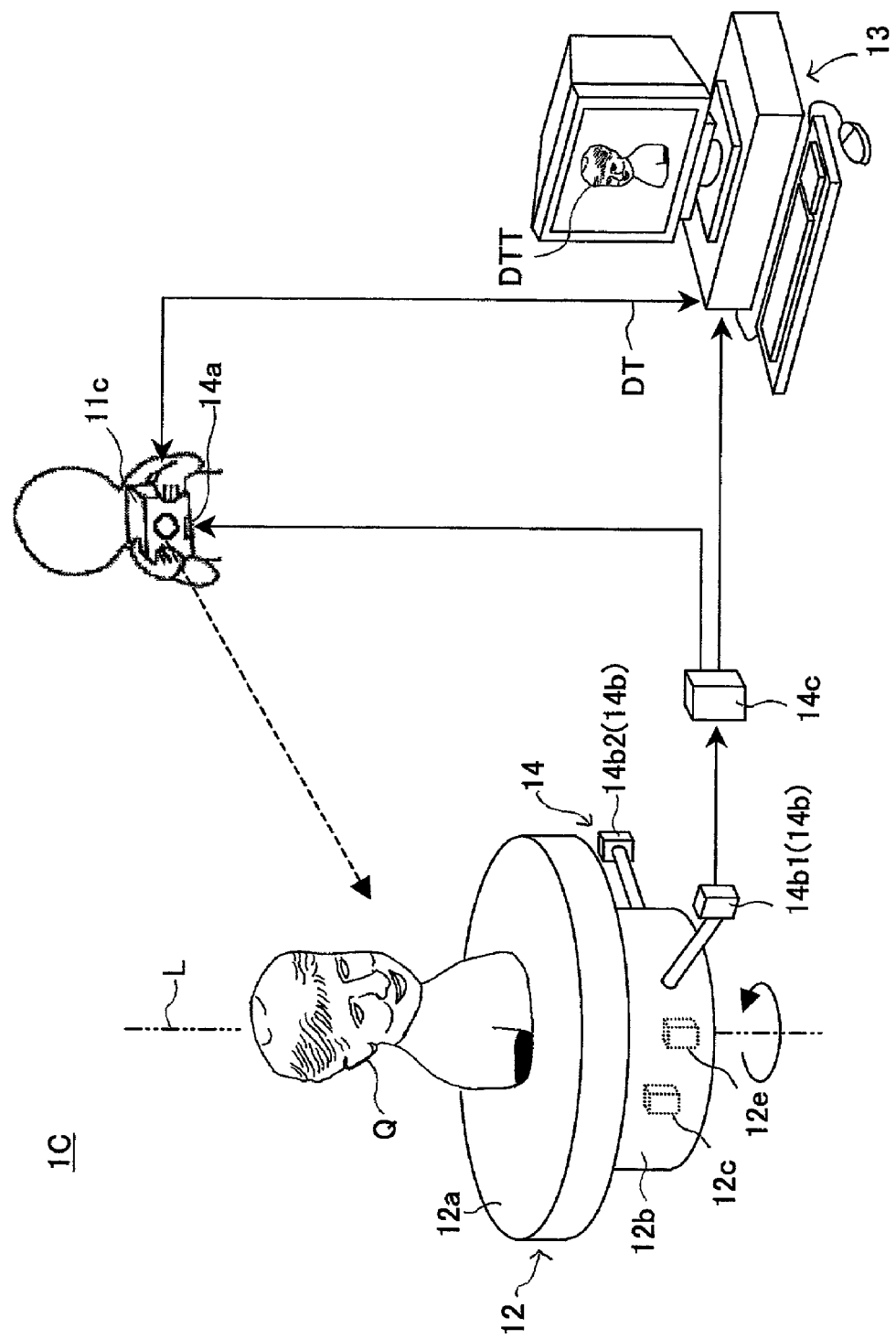
FIG. 13 shows a three-dimensional data generating system according to a third embodiment.
Figure 14:
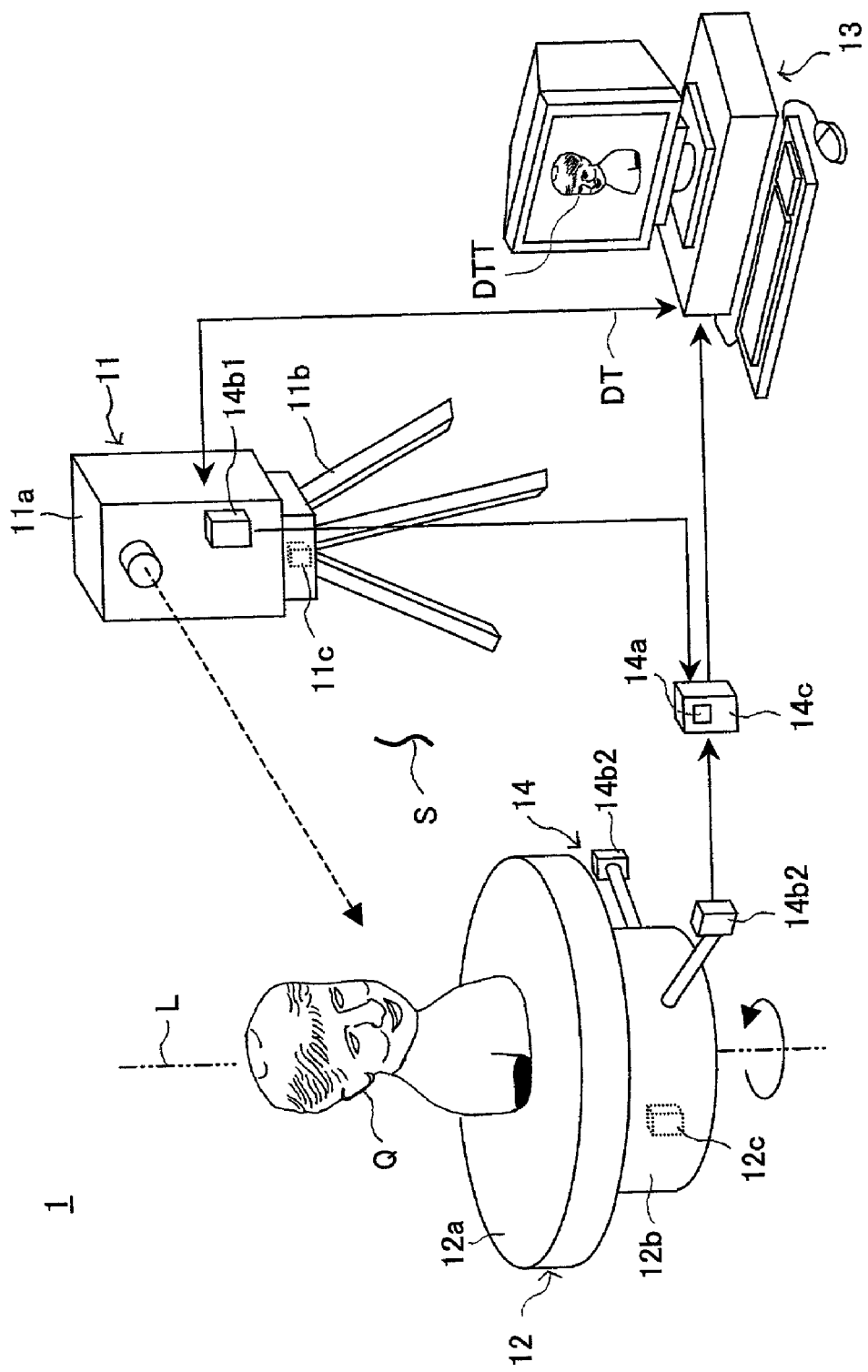
FIG. 14 shows another example of setting of the three-dimensional position sensor.
Figure 15:
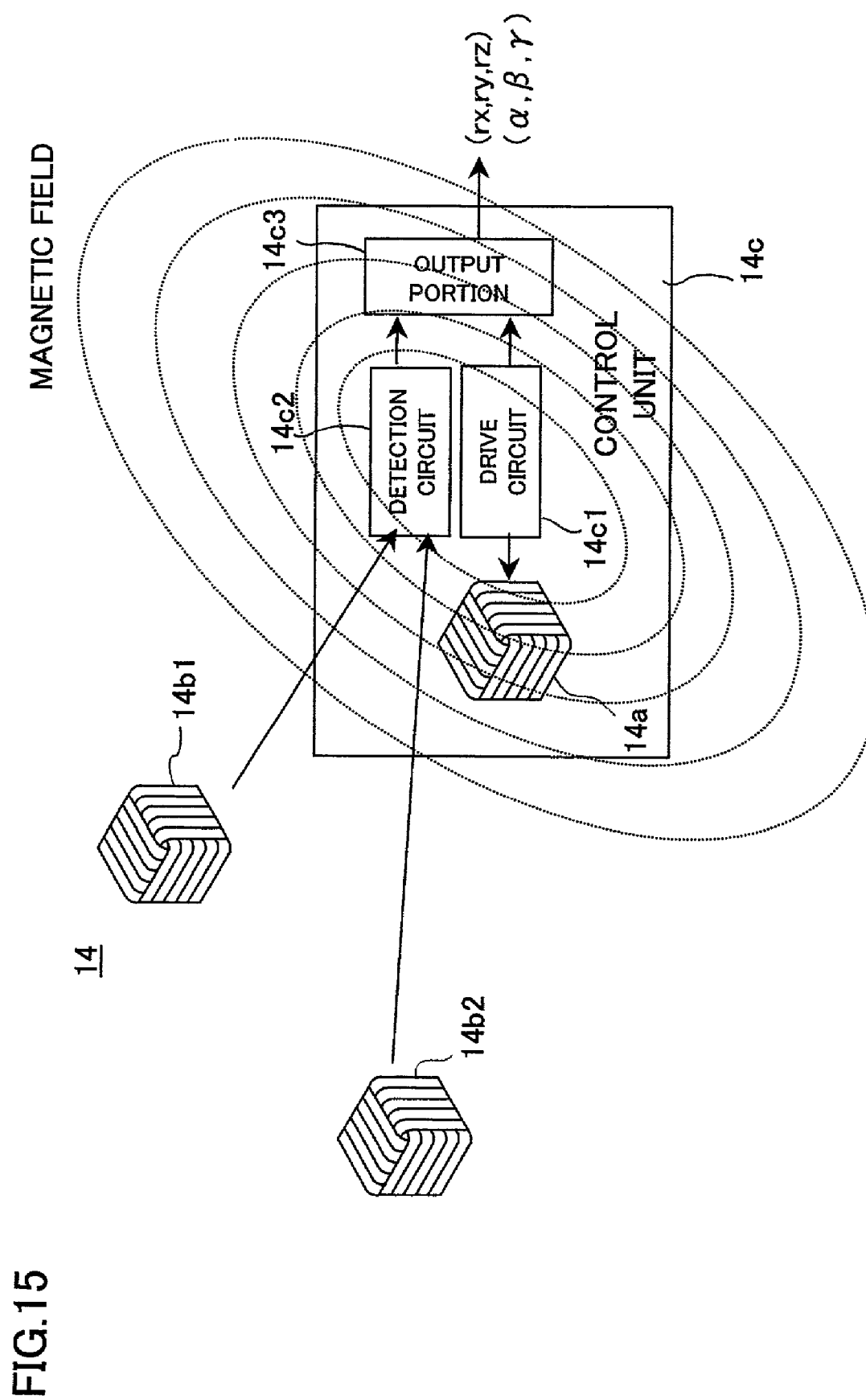
FIG. 15 shows yet another example of setting of the three-dimensional position sensor.
Figure 16:
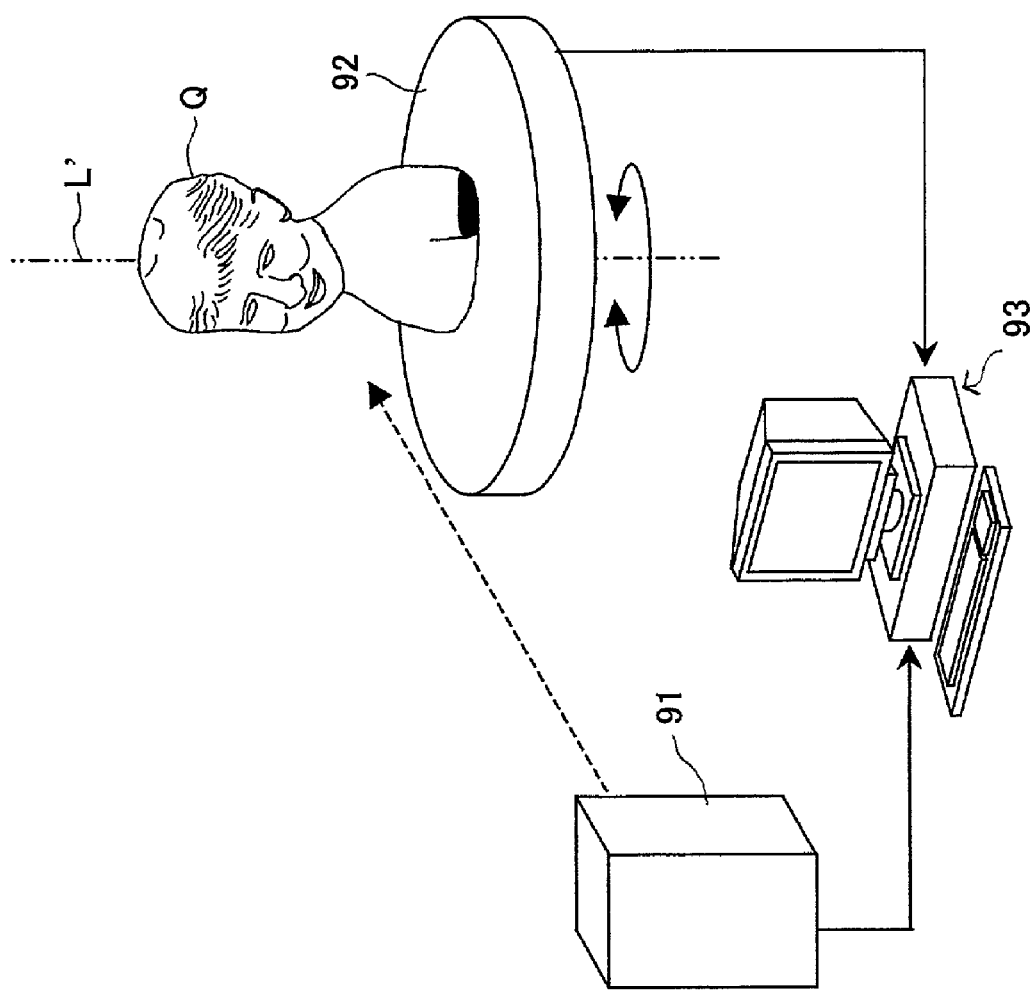
FIG. 16 shows a conventional system for obtaining plural sets of three-dimensional data of an object by measuring the object from different positions.

FIG. 13 shows a three-dimensional data generating system 1C according to a third embodiment of the present invention.

As shown in FIG. 13, a digital camera 11C for imaging a two-dimensional image is used in the three-dimensional data generating system 1C. An operator has the digital camera 11C in his/her hand and images the object Q. The position of the digital camera 11c is changed for photographing the object Q. Alternatively, the position or the posture of the object Q is changed by rotation of a turn table 12a for photographing the object Q. Thus, the object Q is repeatedly photographed plural times, resulting in imaging the whole periphery of the object Q. Thereby, it is possible to obtain a plurality of images having parallax with respect to the object Q. Information concerning relationships of a relative position and a relative posture between the digital camera 11C and the object Q can be obtained each time when the object Q is photographed.

The stereo imaging method is used for generating three-dimensional data based on a set of two images among the obtained plural images. Measurement is conducted one time by generating a set of three-dimensional data from the two images. The generation of a set of three-dimensional data as described above is performed plural times by using combination of different images so that plural sets of three-dimensional data are generated. The plural sets of three-dimensional data are integrated so as to be a set of three-dimensional data.

The control unit 14c outputs information concerning relationships of a relative position and a relative posture between the digital camera 11c and the object Q during imaging. The information is used for an operation processing in the computer device 13 in the case of the generation of the three-dimensional data by the stereo imaging method and the integration of the three-dimensional data.

It is possible to change the three-dimensional data generating systems 1, 1B and 1C, structures of the apparatuses, contents of processing of the apparatuses, order of the processing and the like without departing from the spirit and scope of the present invention.

According to each of the embodiments described above, it is possible to reduce immeasurable parts of an object even when the object has a complicated shape as compared with conventional methods and to generate three-dimensional data of such object with high precision. Additionally, preparation before three-dimensional measurement can be decreased, resulting in reducing user's workload.

What is claimed is:

1. A three-dimensional data generating system comprising:
    a measurement portion for generating three-dimensional data by measuring a three-dimensional shape of an object from plural directions so as to generate plural data;
    a position and posture changing portion for changing a position or a posture of the object;
    a position and posture sensing portion including a first element provided in the measurement portion and a second element provided in the position and posture changing portion, wherein the position and posture sensing portion measures a relative position and a relative posture between the first element and the second element; and
    a data integrating portion for integrating plural sets of three-dimensional data generated by plural times of measurements in the measurement portion based on each of the relative positions and the relative postures measured by the position and posture sensing portion at each of the measurements, wherein
    integrating the plural sets of three-dimensional data includes converting the coordinates of the plurality of three-dimensional data into a common three-dimensional coordinate system by using a conversion matrix, and
    the position and posture sensing portion measures the relative position and the relative posture between the first element and the second element by electromagnetic induction.

2. The three-dimensional data generating system according to claim 1, wherein
    the position and posture changing portion includes a movable member whose position and posture are kept constant with respect to the object during the plural times of measurements; and
    the second element is provided in the movable member.

3. The three-dimensional data generating system according to claim 2, wherein
    the position and posture changing portion further includes a support board for changing the position and the posture of the movable member; and
    the movable member is a turn table rotationally driven by the support board.

4. The three-dimensional data generating system according to claim 1, wherein
    the position and posture changing portion includes:
        a movable member whose position and posture are kept constant with respect to the object during the plural times of measurements,
        a base member for changing the position and the posture of the movable member, and
        a detecting portion for detecting an amount of change of the position and the posture of the movable member with respect to the base member; and
    the second element is provided in the base member.

5. The three-dimensional data generating system according to claim 4, wherein
    the base member is a support board and the movable member is a turn table rotationally driven by the support board; and
    the detecting portion includes an encoder for encoding a rotational angle of the turn table to the support board.

6. The three-dimensional data generating system according to claim 1, wherein
    the first element measures the position and the posture of the second element with respect to the first element.

7. The three-dimensional data generating system according to claim 1, wherein
    the second element measures the position and the posture of the first element with respect to the second element.

8. The three-dimensional data generating system according to claim 1, wherein
    plural second elements are provided in the position and posture changing portion.

9. A method of generating three-dimensional data comprising:
    generating three-dimensional data by measuring, using a measuring portion, a three-dimensional shape of an object from plural directions so as to generate plural data;
    changing a position or a posture of the object using a position and posturing changing portion;
    measuring a relative position and relative posture between a first element provided in the measuring portion and a second element provided in the position and posturing changing portion; and
    integrating plural sets of three-dimensional data generated by plural times of measurements based on each of the measured relative positions and the relative postures measured at each of the measurements, wherein
    integrating the plural sets of three-dimensional data includes converting the coordinates of the plurality of three-dimensional data into a common three-dimensional coordinate system by using a conversion matrix, and
    measuring a relative posture includes measuring the position and the posture of the first element with respect to the second element.

10. The method of generating three-dimensional data according to claim 9, wherein
    the position and posture changing portion includes a movable member whose position and posture are kept constant with respect to the object during the plural times of measurements; and
    the second element is provided in the movable member.

11. The method of generating three-dimensional data according to claim 10, wherein
    the position and posture changing portion further includes a support board for changing the position and the posture of the movable member; and
    the movable member is a turn table rotationally driven by the support board.

12. The method of generating three-dimensional data according to claim 9, wherein the position and posture changing portion includes:
    a movable member whose position and posture are kept constant with respect to the object during the plural times of measurements, and
    a base member for changing the position and the posture of the movable member, the second element is provided in the base member; and wherein the method further comprises:
  detecting an amount of change of the position and the posture of the movable member with respect to the base member.

13. The method of generating three-dimensional data according to claim 12, wherein
  the base member is a support board and the movable member is a turn table rotationally driven by the support board; and
  the detecting portion includes an encoder for encoding a rotational angle of the turn table to the support board.

14. The method of generating three-dimensional data according to claim 9, wherein
  plural second elements are provided in the position and posture changing portion.

15. The method of generating three-dimensional data according to claim 9, wherein
  electromagnetic induction is used in measuring the relative position and the relative posture between the first element and the second element.

16. A three-dimensional data generating system comprising:
  a measurement portion for generating three-dimensional data by measuring a three-dimensional shape of an object from plural directions so as to generate plural data;
  a position and posture changing portion for changing a position or a posture of the object;
  a position and posture sensing portion including a first element provided in the measurement portion and a second element provided in the position and posture changing portion, wherein the position and posture sensing portion measures a relative position and a relative posture between the first element and the second element; and
  a data integrating portion for integrating plural sets of three-dimensional data generated by plural times of measurements in the measurement portion based on each of the relative positions and the relative postures measured by the position and posture sensing portion at each of the measurements, wherein
  integrating the plural sets of three-dimensional data includes converting the coordinates of the plurality of three-dimensional data into a common three-dimensional coordinate system by using a conversion matrix; and
  the second element measures the position and the posture of the first element with respect to the second element.

17. The three-dimensional data generating system according to claim 16, wherein
  the position and posture changing portion includes a movable member whose position and posture are kept constant with respect to the object during the plural times of measurements,
  the second element is provided in the movable member,
  the position and posture changing portion further includes a support board for changing the position and the posture of the movable member, and
  the movable member is a turn table rotationally driven by the support board.

18. The three-dimensional data generating system according to claim 16, wherein
  the position and posture changing portion includes:
    a movable member whose position and posture are kept constant with respect to the object during the plural times of measurements,
    a base member for changing the position and the posture of the movable member, and
    a detecting portion for detecting an amount of change of the position and the posture of the movable member with respect to the base member;
  the second element is provided in the base member;
  the base member is a support board and the movable member is a turn table rotationally driven by the support board; and
  the detecting portion includes an encoder for encoding a rotational angle of the turn table to the support board.

19. A method of generating three-dimensional data comprising:
  generating three-dimensional data by measuring, using a measuring portion, a three-dimensional shape of an object from plural directions so as to generate plural data;
  changing a position or a posture of the object using a position and posturing changing portion;
  measuring a relative position and relative posture between a first element provided in the measuring portion and a second element provided in the position and posturing changing portion; and
  integrating plural sets of three-dimensional data generated by plural times of measurements based on each of the measured relative positions and the relative postures measured at each of the measurements, wherein
  integrating the plural sets of three-dimensional data includes converting the coordinates of the plurality of three-dimensional data into a common three-dimensional coordinate system by using a conversion matrix, and
  electromagnetic induction is used in measuring the relative position and the relative posture between the first element and the second element.

20. The method of generating three-dimensional data according to claim 19, wherein measuring a relative posture includes measuring the position and the posture of the second element with respect to the first element.

21. The method of generating three-dimensional data according to claim 19, wherein measuring a relative posture includes measuring the position and the posture of the first element with respect to the second element.

22. The method of generating three-dimensional data according to claim 19, wherein
  the position and posture changing portion includes a movable member whose position and posture are kept constant with respect to the object during the plural times of measurements,
  the second element is provided in the movable member,
  the position and posture changing portion further includes a support board for changing the position and the posture of the movable member, and
  the movable member is a turn table rotationally driven by the support board.

23. The method of generating three-dimensional data according to claim 19, wherein
  the position and posture changing portion includes:
    a movable member whose position and posture are kept constant with respect to the object during the plural times of measurements, and a base member for changing the position and the posture of the movable member, the second element is provided in the base member;

the method further comprises:

detecting an amount of change of the position and the posture of the movable member with respect to the base member;

the base member is a support board and the movable member is a turn table rotationally driven by the support board; and the detecting portion includes an encoder for encoding a rotational angle of the turn table to the support board.

* * * * *